(12) United States Patent
Galloway

(10) Patent No.: US 9,492,930 B2
(45) Date of Patent: Nov. 15, 2016

(54) MECHANICALLY PROGRAMMED SOFT ACTUATORS WITH CONFORMING SLEEVES

(71) Applicant: President and Fellows of Harvard College, Cambridge, MA (US)

(72) Inventor: Kevin Galloway, Somerville, MA (US)

(73) Assignee: President and Fellows of Harvard College, Cambridge, MA (US)

(*) Notice: Subject to any disclaimer, the term of this patent is extended or adjusted under 35 U.S.C. 154(b) by 0 days.

(21) Appl. No.: 15/028,993

(22) PCT Filed: Oct. 16, 2014

(86) PCT No.: PCT/US2014/060870
§ 371 (c)(1),
(2) Date: Apr. 13, 2016

(87) PCT Pub. No.: WO2015/102723
PCT Pub. Date: Jul. 9, 2015

(65) Prior Publication Data
US 2016/0263751 A1    Sep. 15, 2016

Related U.S. Application Data

(60) Provisional application No. 61/893,093, filed on Oct. 18, 2013.

(51) Int. Cl.
| F15B 7/06 | (2006.01) |
| B25J 18/06 | (2006.01) |
| B25J 9/14 | (2006.01) |
| B25J 15/00 | (2006.01) |
| B25J 15/12 | (2006.01) |
| F15B 15/10 | (2006.01) |

(52) U.S. Cl.
CPC .............. *B25J 18/06* (2013.01); *B25J 9/142* (2013.01); *B25J 15/0023* (2013.01); *B25J 15/12* (2013.01); *F15B 15/103* (2013.01)

(58) Field of Classification Search
CPC ...... F15B 15/103; B25J 9/1075; B25J 9/142; B25J 11/00
USPC ............................................... 92/92
See application file for complete search history.

(56) References Cited

U.S. PATENT DOCUMENTS

| 3,343,864 A * | 9/1967 | Baer ............... B25J 15/0009 294/119.3 |
| 3,601,442 A * | 8/1971 | Orndorff ............ B25J 15/0023 294/119.3 |
| 5,021,064 A * | 6/1991 | Caines ............... A61F 2/68 623/26 |
| 6,718,766 B2 * | 4/2004 | Seto ................. B25J 9/142 60/476 |
| 6,772,673 B2 * | 8/2004 | Seto ................. B25J 9/142 92/92 |

(Continued)

FOREIGN PATENT DOCUMENTS

WO    2015066143 A1    5/2015

*Primary Examiner* — Thomas E Lazo
(74) *Attorney, Agent, or Firm* — Modern Times Legal; Robert J. Sayre

(57) ABSTRACT

A mechanically programmed actuator includes at least one soft actuator body configured to bend, linearly extend, contract, twist, or combinations thereof when actuated without constraint; an activation mechanism (e.g., a fluid pump) configured to actuate the soft actuator body; and at least one sleeve wrapped around part of the soft actuator body and configured to constrain the soft actuator body inside the sleeve when actuated and to cause the soft actuator body to deform where not covered by the sleeve.

21 Claims, 18 Drawing Sheets

(56) References Cited

U.S. PATENT DOCUMENTS

| | | | | |
|---|---|---|---|---|
| 7,258,379 B2* | 8/2007 | Ono | ................... | B25J 9/142 |
| | | | | 294/119.3 |
| 7,331,273 B2* | 2/2008 | Kerekes | ............... | B60N 2/4415 |
| | | | | 92/90 |
| 7,617,762 B1* | 11/2009 | Ragner | ................... | F16J 3/06 |
| | | | | 92/37 |
| 2002/0083828 A1* | 7/2002 | Bernier | ................... | F04B 9/10 |
| | | | | 92/92 |
| 2002/0108491 A1* | 8/2002 | Stahn | ................... | F01B 19/04 |
| | | | | 92/92 |
| 2004/0267331 A1* | 12/2004 | Koeneman | ............... | A61H 1/02 |
| | | | | 607/49 |
| 2013/0106127 A1 | 5/2013 | Lipson et al. | | |
| 2014/0314976 A1 | 10/2014 | Niiyama et al. | | |
| 2015/0090113 A1 | 4/2015 | Galloway | | |

* cited by examiner

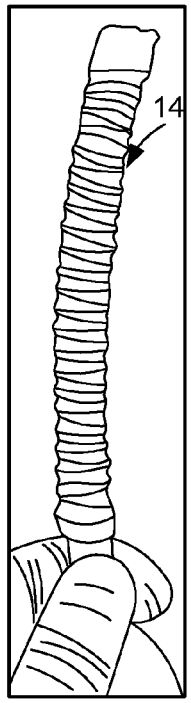 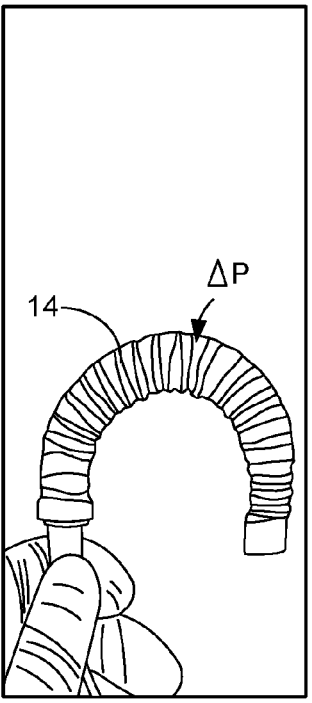 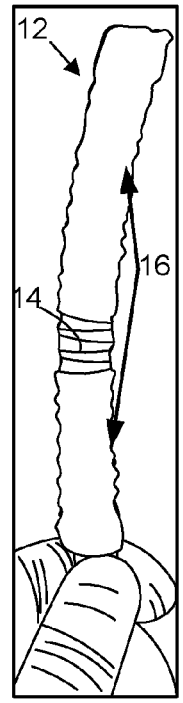 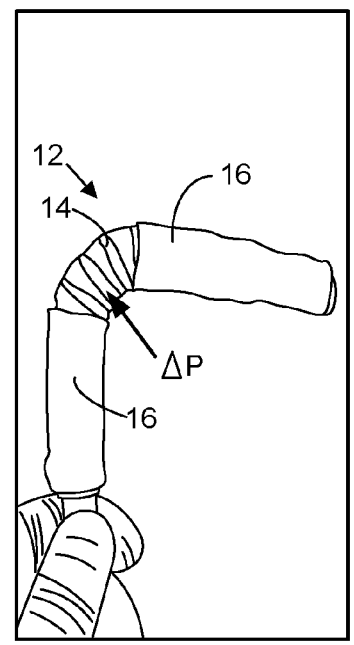
FIG. 1　　FIG. 2　　FIG. 3　　FIG. 4
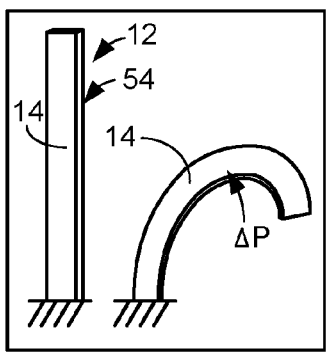 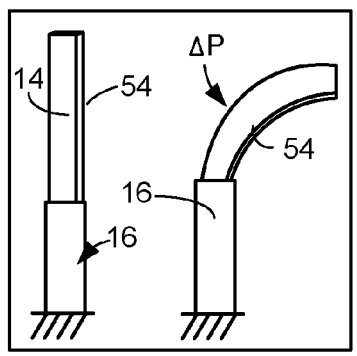 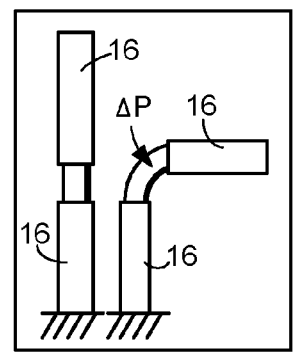
FIG. 5　　FIG. 6　　FIG. 7

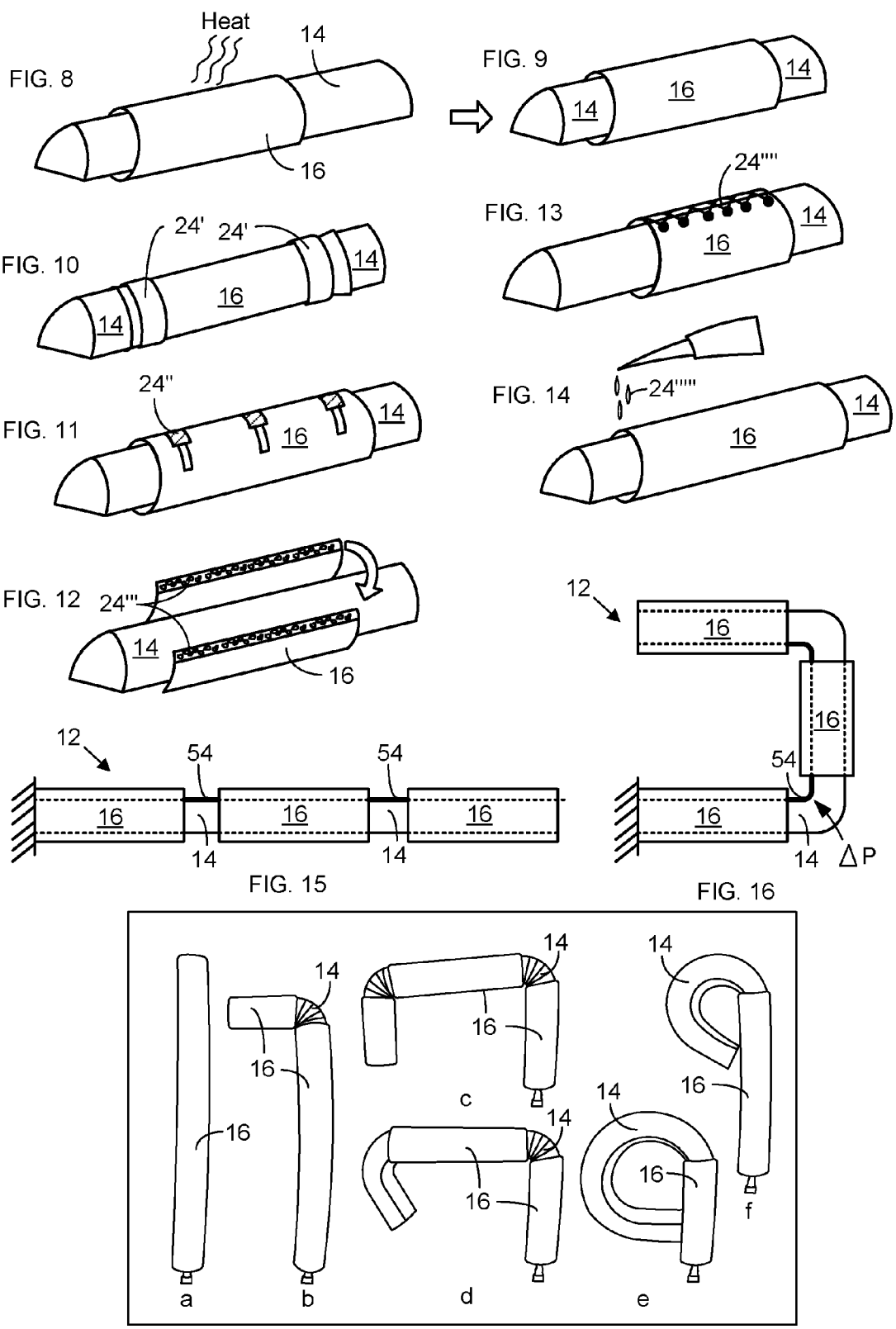

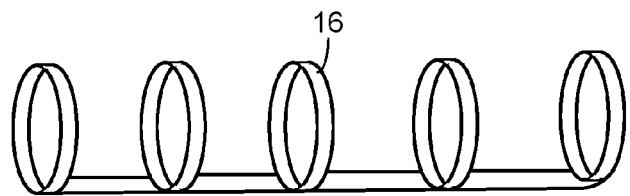
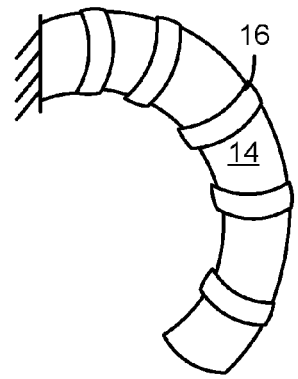
FIG. 40
FIG. 41
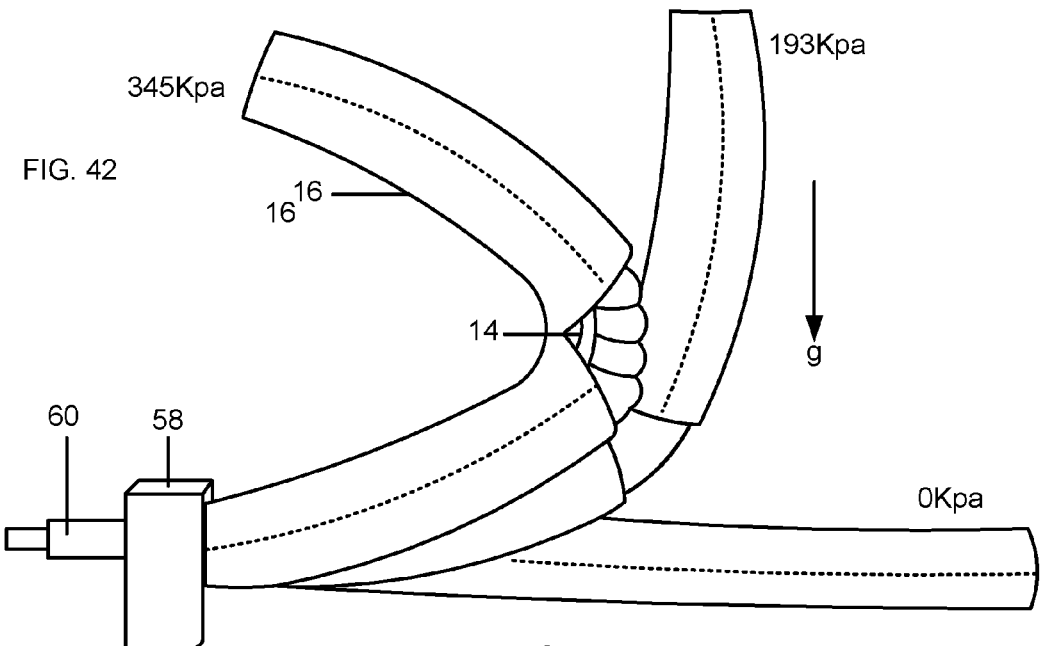
FIG. 42
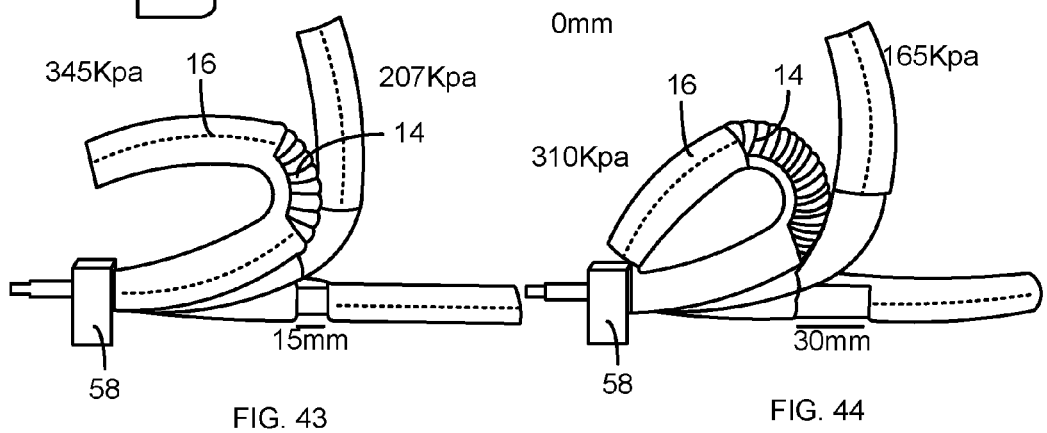
FIG. 43
FIG. 44

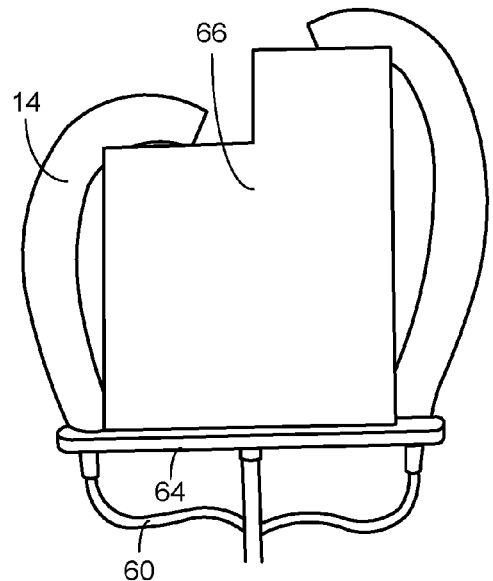
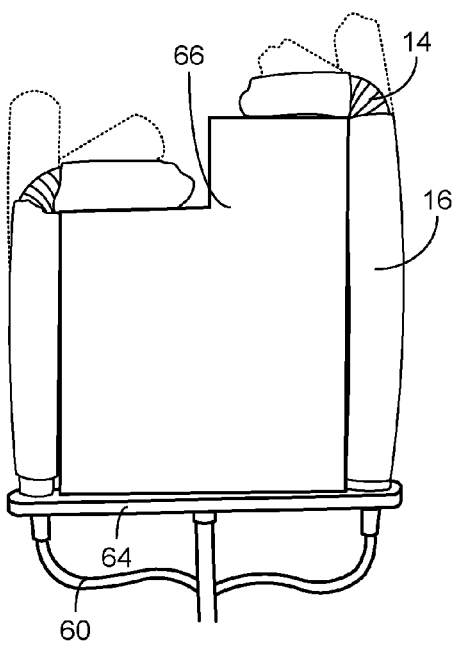
FIG. 57  FIG. 58
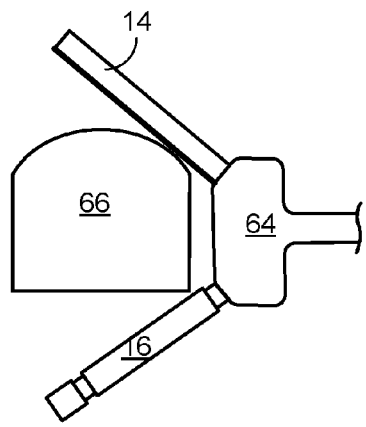
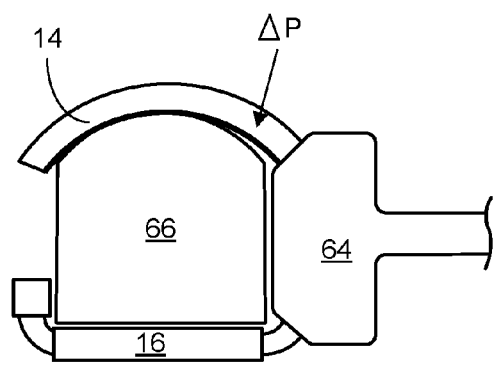
FIG. 59  FIG. 60

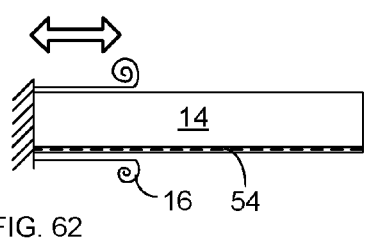
FIG. 61
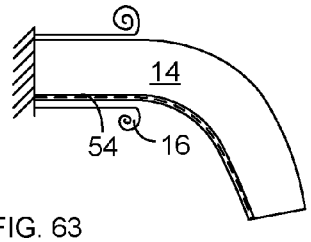
FIG. 62
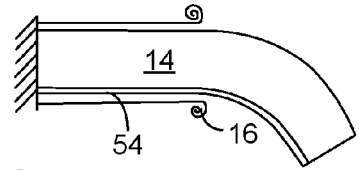
FIG. 63
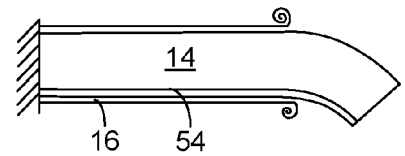
FIG. 64
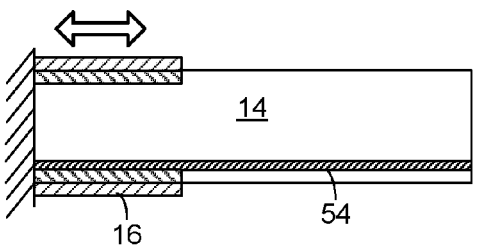
FIG. 65
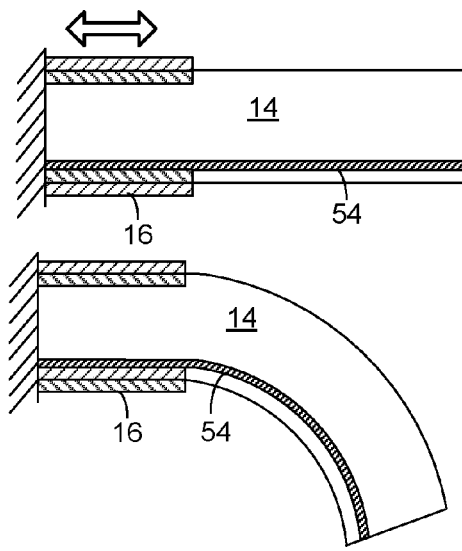
FIG. 66
FIG. 67
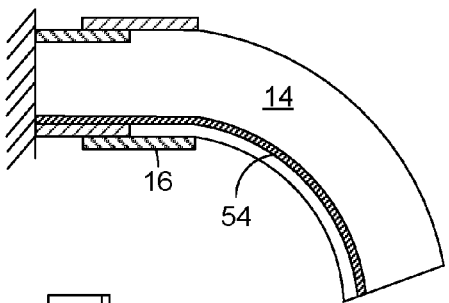
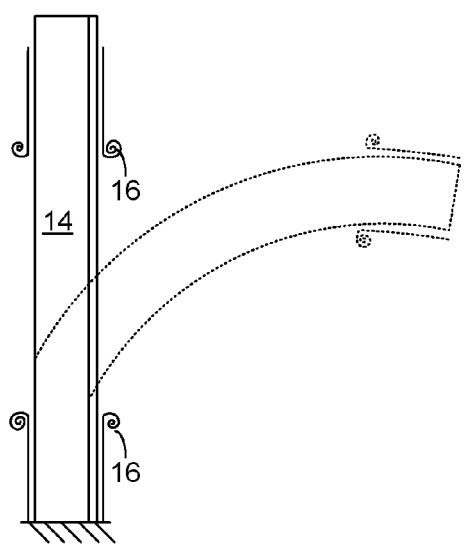
FIG. 68
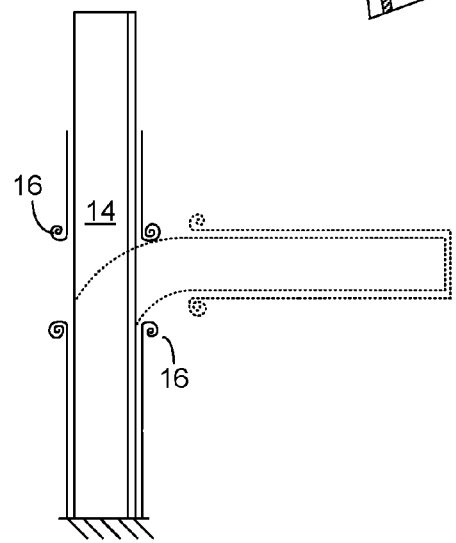
FIG. 69

MECHANICALLY PROGRAMMED SOFT ACTUATORS WITH CONFORMING SLEEVES

GOVERNMENT SUPPORT

This invention was made with government support under Grant No. W911NF-11-1-0094 awarded by the Defense Advanced Research Projects Agency. The United States Government has certain rights in the invention.

BACKGROUND

Soft actuators offer several desirable features not found in rigid mechanical systems including the ability to embed complex motions into a monolithic structure, and inherent compliance due to the elastomeric materials and pressurized fluids. Computer-aided drafting (CAD) programs and three-dimensional (3D) printers allow relatively fast iteration of mold designs for actuator fabrication (on the order of days); these approaches, however, may not allow for "on-the-fly" modification of a soft actuator's output motions, connection interfaces, and surface properties. This capacity is advantageous where immediate customization is needed, such as on the production floor for robotic manipulation or rehabilitation, where patient needs vary.

SUMMARY

Mechanically programmed soft actuators and methods for their fabrication and use are described herein. Various embodiments of the apparatus and methods may include some or all of the elements, features and steps described below.

A mechanically programmed soft actuator includes at least one soft actuator body where a least a portion of it is configured to bend, linearly extend, contract, twist or combinations thereof when actuated without constraint; an activation mechanism (e.g., a fluid pump) configured to actuate the soft actuator body; and at least one conforming sleeve wrapped around part of the soft actuator body and configured to constrain the soft actuator body inside the sleeve when actuated and to cause the soft actuator body to bend where it is not covered by the sleeve.

In a method for mechanical actuation, fluid (e.g., air or liquid) is pumped into a chamber defined by the soft actuator body, causing the soft actuator body to bend where the soft actuator body is not covered by the sleeve, while the sleeve constrains bending of the soft actuator body where the sleeve covers the soft actuator body.

Embodiments of these actuators can provide for safe human-robot interaction, where soft tissues (e.g., skin) can interact with soft and compliant robotic actuators to increase comfort and to reduce the risk of injury to the user. These soft actuators are suitable for a variety of uses including use as robotic actuators to assist human movement, use as a conformable gripper for manipulating objects and use in toys (e.g., as an interface for video games).

BRIEF DESCRIPTION OF THE DRAWINGS

FIG. 1 is a photographic image of a curling soft actuator body 14 without a sleeve.

FIG. 2 is a photographic image of the curling soft actuator body 14 of FIG. 1 after a change in pressure in the actuator body 14.

FIG. 3 is a photographic image of the soft actuator body 14 of FIG. 1 surrounded by sleeves 16 respectively at its base and at its remote end.

FIG. 4 is a photographic image of the actuator 12 of FIG. 3 after a change in pressure in the actuator body 14.

FIG. 5 is an illustration of a soft actuator body 14 with a strain-limiting layer 54 on its right side; an initial position of the actuator body 14 is shown at left, while the curl in the actuator body 14 due to the strain-limiting layer 54 after a change in pressure in the actuator body 14 is shown at right.

FIG. 6 is an illustration of a soft actuator body 14 surrounded by a sleeve 16 at its base and with a strain-limiting layer 54 on its right side; an initial position of the actuator body 14 is shown at left, while the curl in the actuator body 14 due to the strain-limiting layer 54 above the sleeve 16 after a change in pressure in the actuator body 14 is shown at right.

FIG. 7 is an illustration of a soft actuator body 14 surrounded by sleeves 16 respectively at its base and at its remote end and with a strain-limiting layer 54 on its right side; an initial position of the actuator body 14 is shown at left, while the bend in the actuator body 14 due to the strain-limiting layer 54 between the sleeves 16 after a change in pressure in the actuator body 14 is shown at right.

FIG. 8 shows a sleeve 16 thermoformed to a soft actuator body 14 via the application of heat.

FIG. 9 shows the soft actuator body 14 with the sleeve 16 thermoformed thereon.

FIG. 10 shows a sleeve 16 attached to a soft actuator body 14 via pinch clamps 24' secured about the sleeve 16.

FIG. 11 shows a sleeve 16 attached to a soft actuator body 14 via zip ties 24" secured about the sleeve 16.

FIG. 12 shows a sleeve 16 secured to a soft actuator body 14 via respective surfaces of hooks and loops 24''' on the top side of one end of the sleeve 16 and on the bottom side of the opposite end of the sleeve 16.

FIG. 13 shows a sleeve 16 secured to a soft actuator body 14 via a lace 24'''' threaded through apertures along each of the opposite ends of the sleeve 16.

FIG. 14 shows a sleeve 16 secured to a soft actuator body 14 via glue 24''''' inserted between the sleeve 16 and the soft actuator body 14.

FIG. 15 shows an actuator 12 with a plurality of joints formed between more than two sleeves 16 spaced along the length of the actuator 12.

FIG. 16 shows the actuator 12 of FIG. 15 after a pressure change in the soft actuator body 14, where the soft actuator body 14 bends between the sleeves 16.

FIG. 17 shows a variety of embodiments of actuators wherein the soft actuator body 14 is covered by one, two or three sleeve sections 16 and with the sleeves 16 extending different distances across the soft actuator body 14.

FIGS. 40 and 41 show sleeve rings 16 that are narrow in width and spaced along a connecting rigid strip to provide multiple bending positions for the underlying soft actuator body 14.

FIGS. 42-44 show the bending of a soft actuator body 14 at sleeve spacings of 0, 15, and 30 mm, respectively; the shadow images show the actuators bending at different pressures.

FIGS. 57 and 58 show additional embodiments of soft actuator bodies 14 grasping an object 66, respectively, with and without sleeves 16.

FIGS. 59 and 60 show a shape-matched manipulator with a sleeve 16 on a curling soft actuator body 14 and a second curling actuator without a sleeve.

FIGS. 61-64 show a sleeve 16 that can be unrolled to provide an adjustable length of bending constraint on an underlying soft actuator body 14.

FIGS. 65-67 show a sleeve 16 that includes a segment that can be extended to provide an adjustable length of bending constraint on an underlying soft actuator body 14.

FIGS. 68 and 69 show a soft actuator body 14 with the adjustable-length sleeves 16 of FIGS. 61 and 64 at both ends of the soft actuator body 14, showing that the bend radius of the soft actuator body 14 decreases as the sleeves 16 are lengthened by further unrolling.

Figure 70:
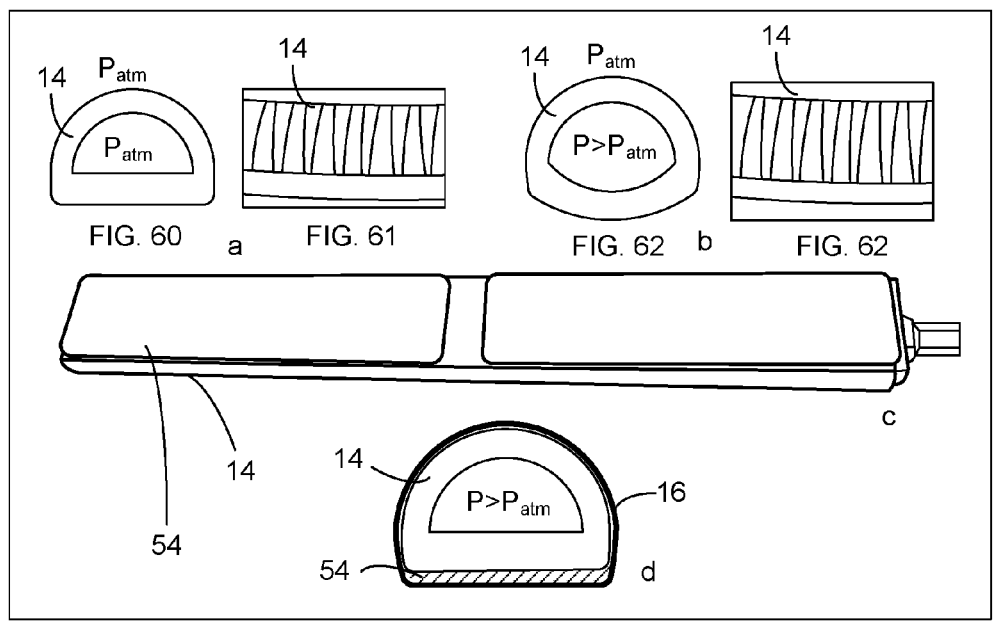

Illustrations (a)-(d) of FIG. 70 show a cross-sectional comparison of a fiber-reinforced actuator body 14, with (c and d) and without (a and b) an inelastic (strain-limiting) fiber-reinforced laminate structure 54, where (a) shows an illustrated cross section and actual side view of an unpressurized fiber-reinforced actuator body 14; (b) shows expansion of the walls of the actuator body 14 due to fluid pressurization; (c) demonstrates placement of an inelastic fiber-reinforced laminate 54 on a fiber-reinforced actuator body 14; and (d) shows an illustrated cross-section view of the actuator when a sleeve 16 is added.

Figure 71:
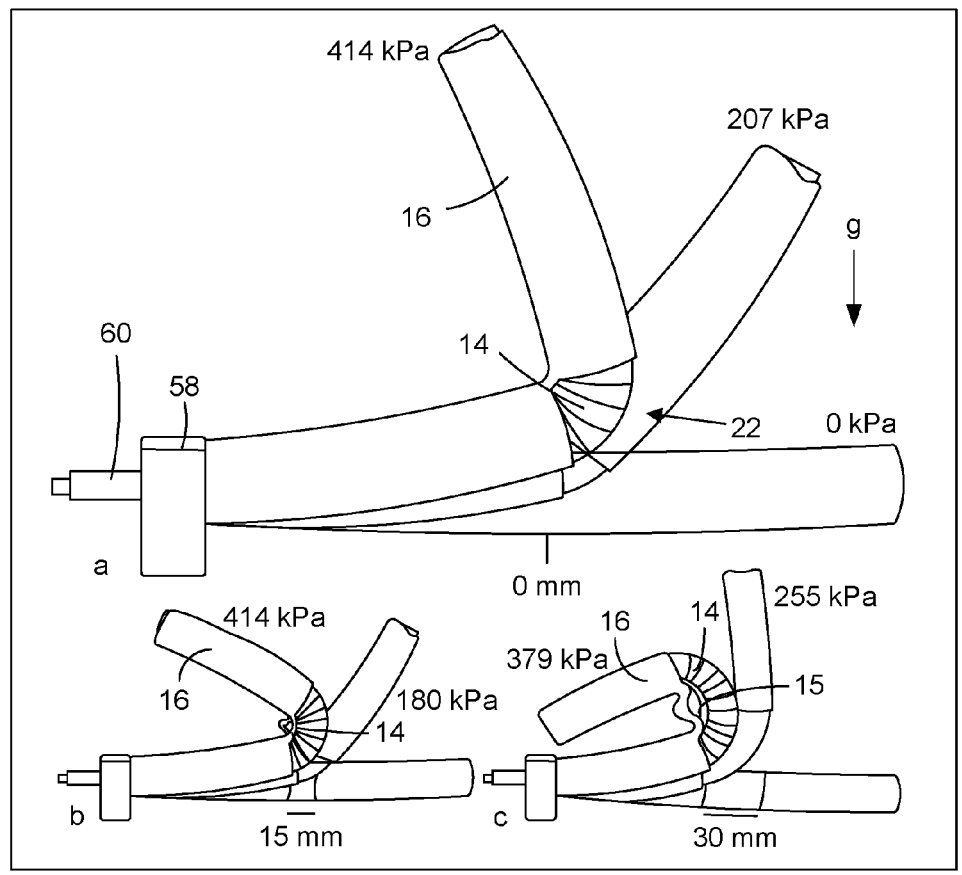

Illustrations (a)-(c) of FIG. 71 show the range of motion of soft bending actuators with inelastic fiber-reinforced laminates on their flat surface with respective sleeve 16 spacings of (a) 0 mm, (b) 15 mm, and (c) 30 mm.

Figures 72, 73:
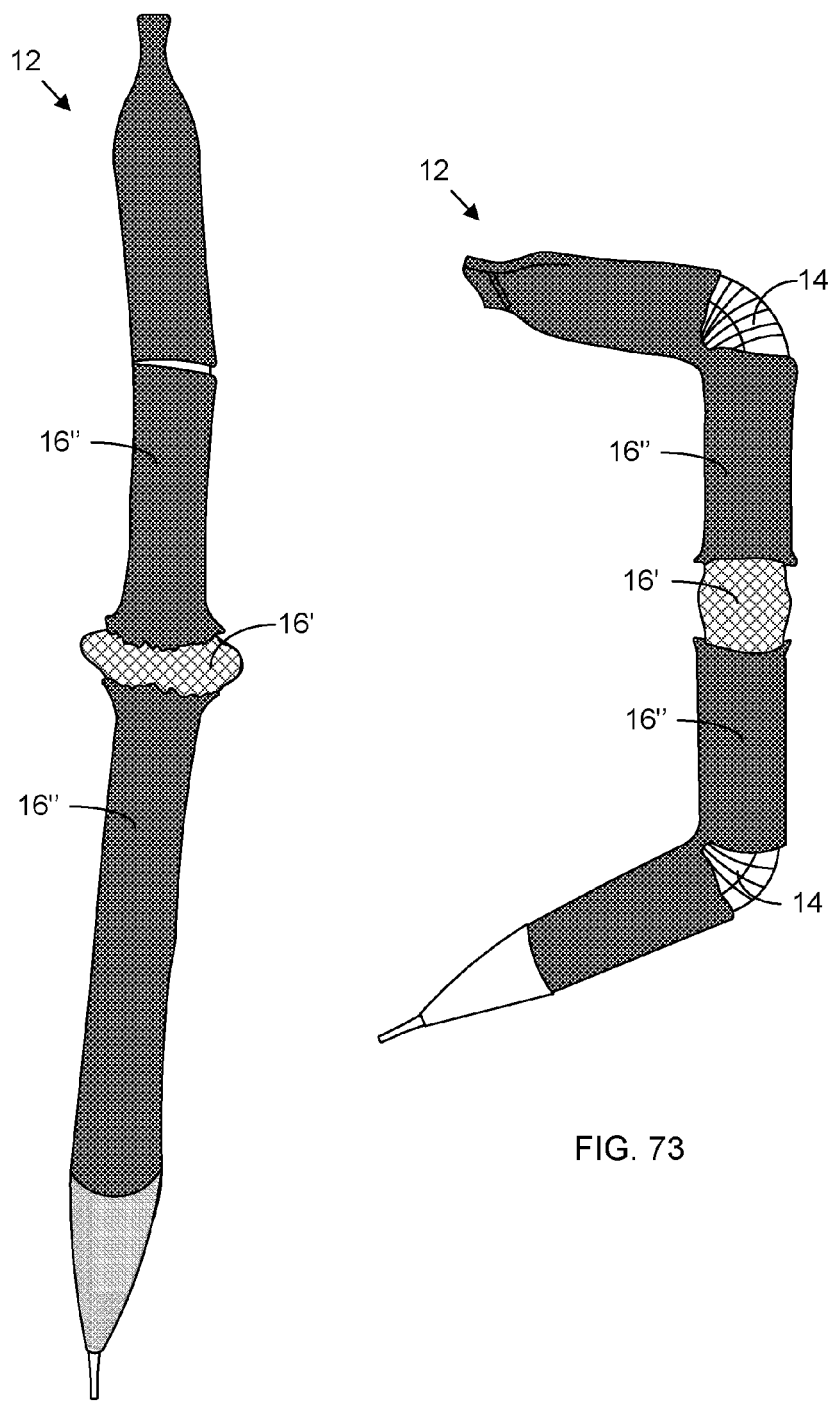

FIG. 72 shows an unactuated linearly extending soft actuator 12 with an inner and outer sleeve 16' and 16" with apertures 22 through both sleeves 16 that serve as bending joints and a gap in the outer sleeve 16" that serves as an extension segment 70 where the inner sleeve 16' can longitudinally extend. The sleeves enable multi-segment motion FIG. 73 shows the soft actuator 12 of FIG. 72 in an actuated state.

Figure 74:
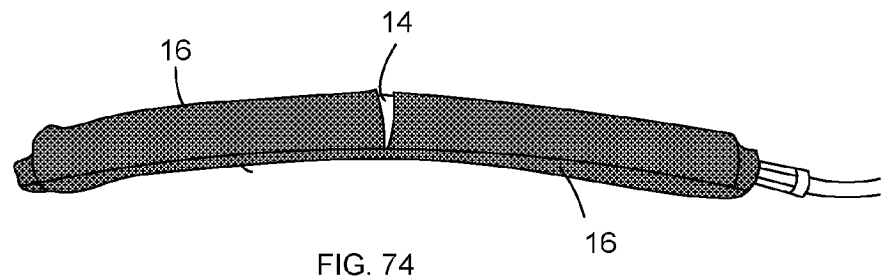

FIG. 74 is a photographic image of a linearly extending soft actuator body 14 contained in a sleeve 16 with an aperture in the form of a slit to generate bending of the actuator.

Figure 75:
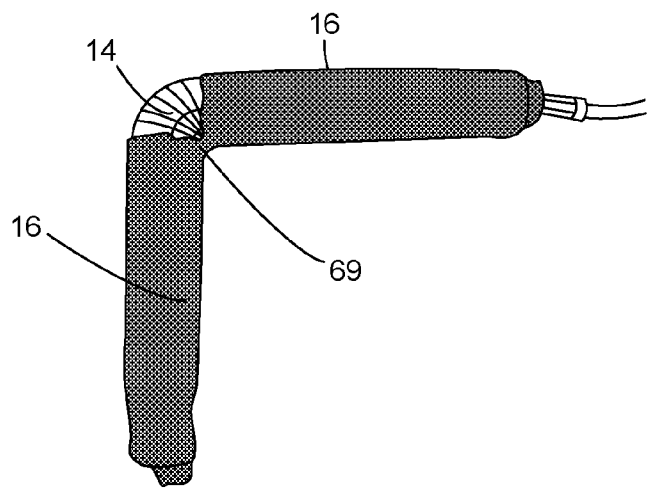

FIG. 75 is a photographic image of the linearly extending soft actuator of FIG. 74 when actuated by fluid pumped into the soft actuator body 14.

Figure 76:
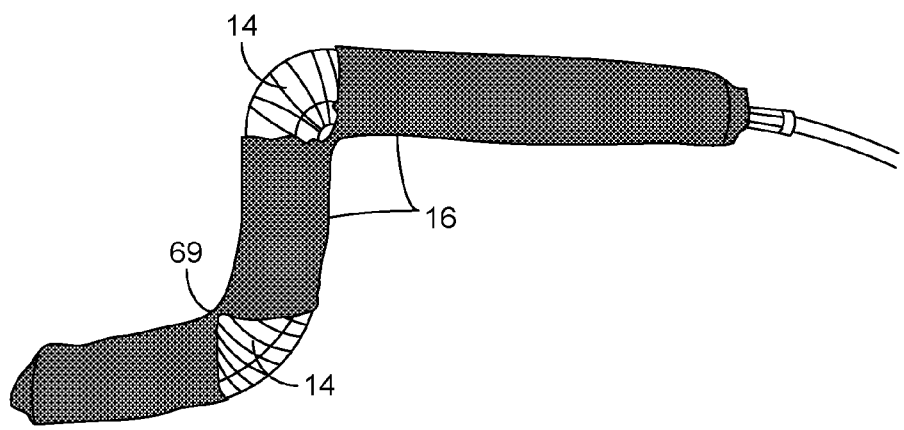

FIG. 76 is a photographic image of a linearly extending soft actuator body 14 contained in a sleeve 16 with two apertures to generate bending of the actuator at each aperture in opposite directions due to the orientation of the apertures.

Figure 77:
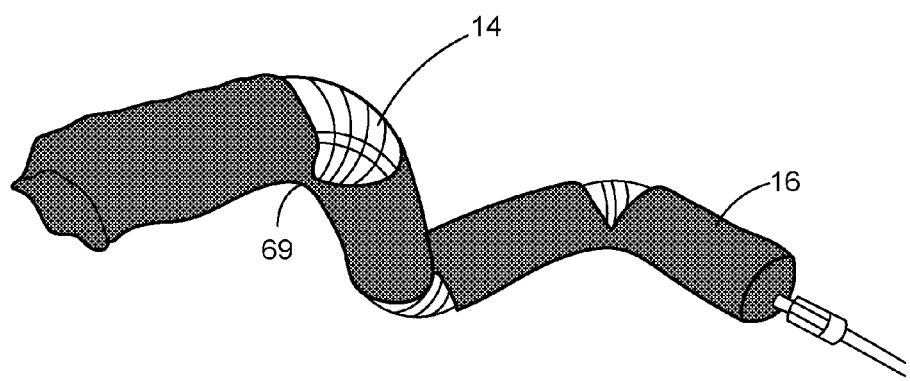

FIG. 77 is a photographic image of a linearly extending soft actuator contained in a sleeve 16 with a plurality of apertures and uncut portions 69 of the sleeve 16 configured to generate bending of the actuator about a plurality of axes with different orientations.

Figure 78:
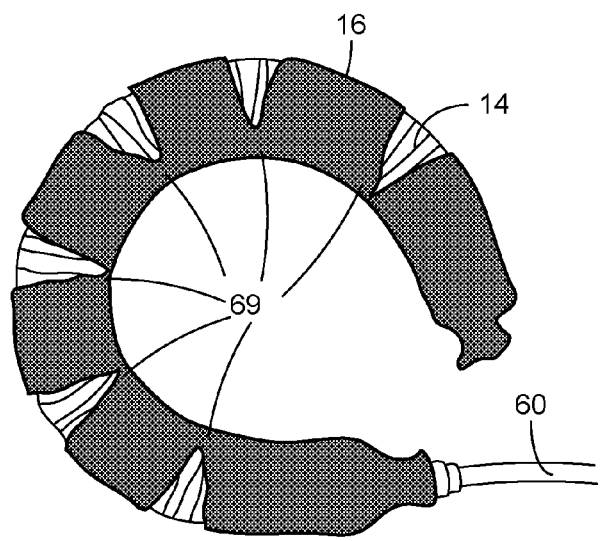

FIG. 78 is a photographic image of a linearly extending soft actuator converted into a bending actuator by a sleeve 16 with uncut portions 69 and a plurality of apertures that share a common orientation and consistent spacing there between.

Figure 79:
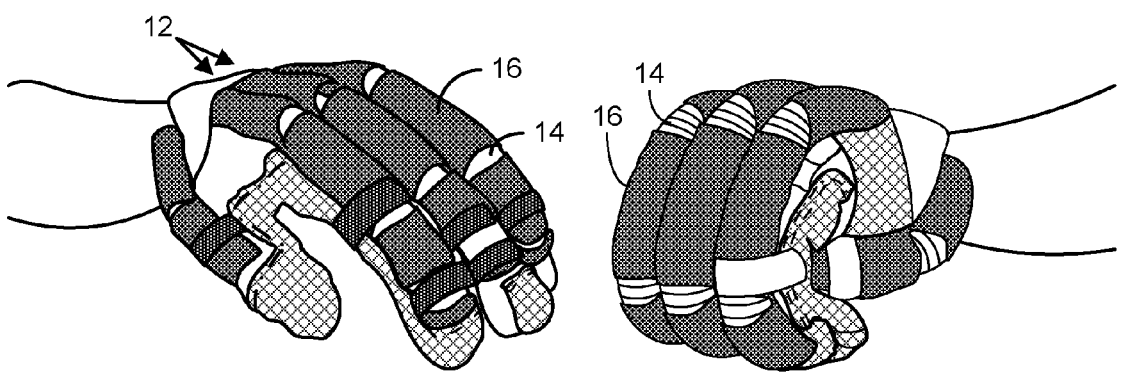
Figure 80:
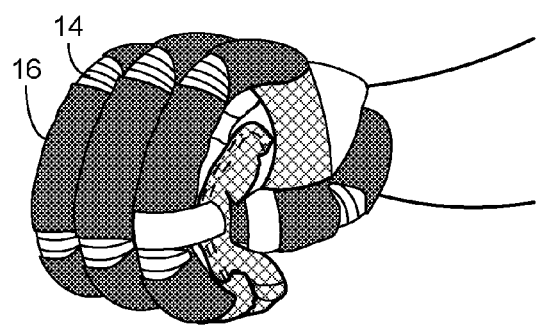

FIGS. 79 and 80 are photographic images of a power grip glove including a curling soft actuator for each finger, wherein each actuator includes a linearly extending soft actuator contained in a sleeve 16 having a plurality of apertures to convert the linear actuation of the soft actuator to a bending/curling motion.

Figure 81:
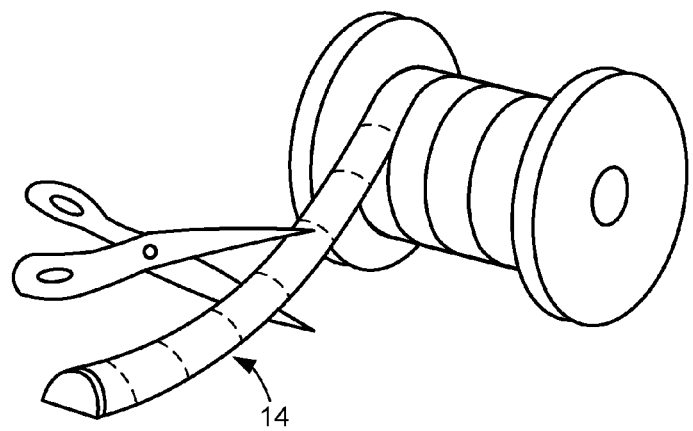

FIG. 81 shows a soft actuator body 14 dispensed from a reel and severable to produce the desired length.

Figure 82:
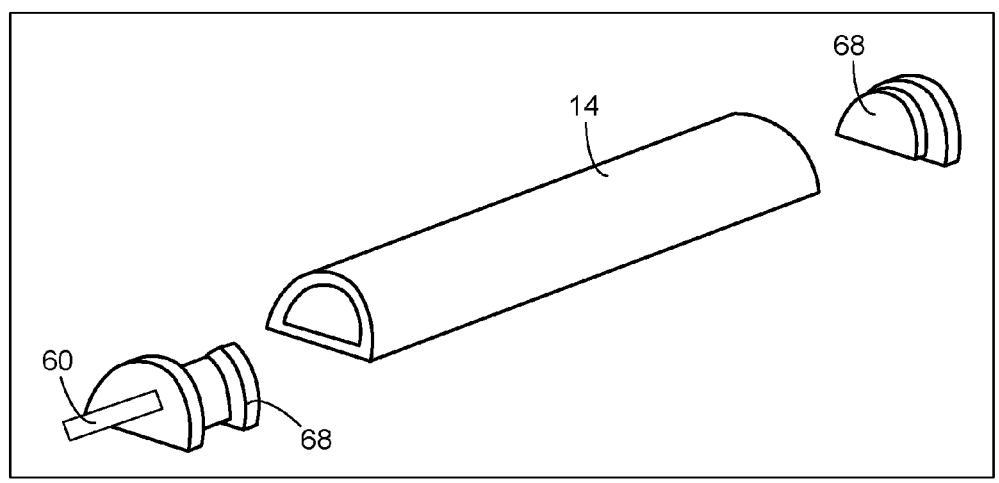

FIG. 82 shows a cut segment of the soft actuator body 14 of FIG. 81 with caps 68 inserted at each end and with a pneumatic or hydraulic connection 60 in one of the end caps to enable the introduction of fluid into the soft actuator body 14.

Figure 83:
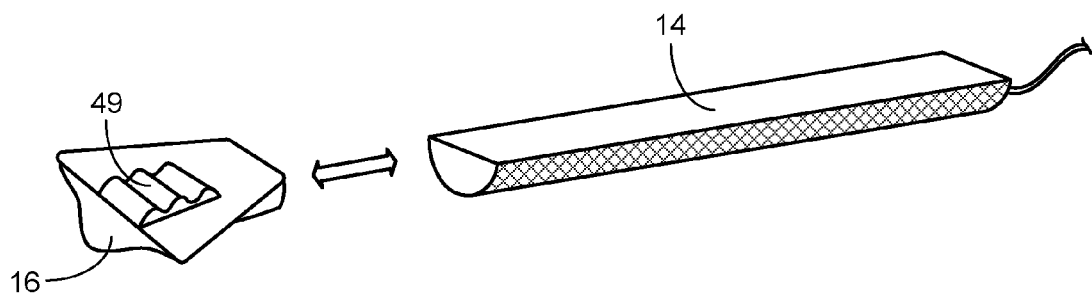
Figure 84:
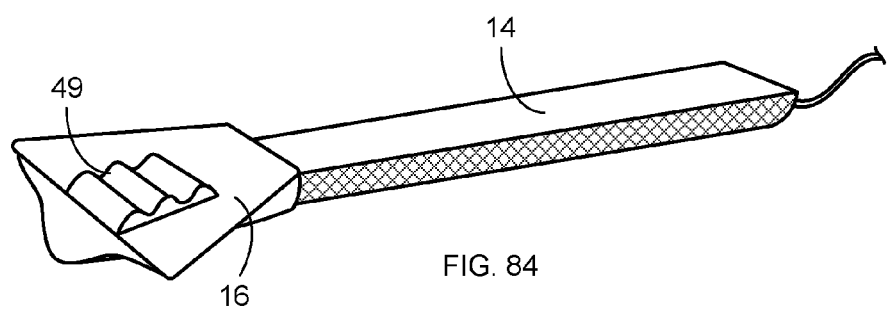
Figure 85:
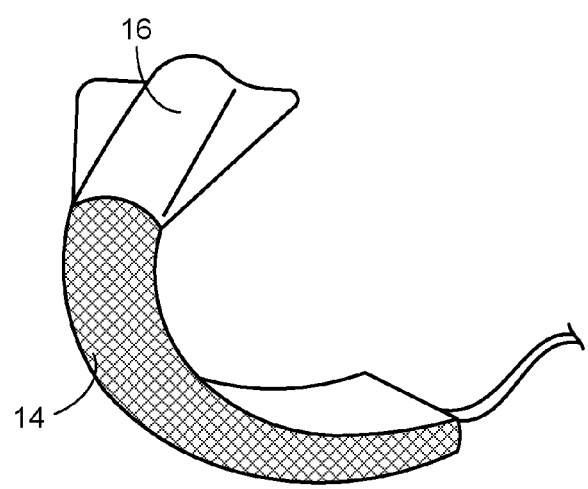

FIGS. 83-85 provide perspective views of a soft actuator body 14 with a sleeve 16 at its distal end that includes gripping features 49.

Figure 86:
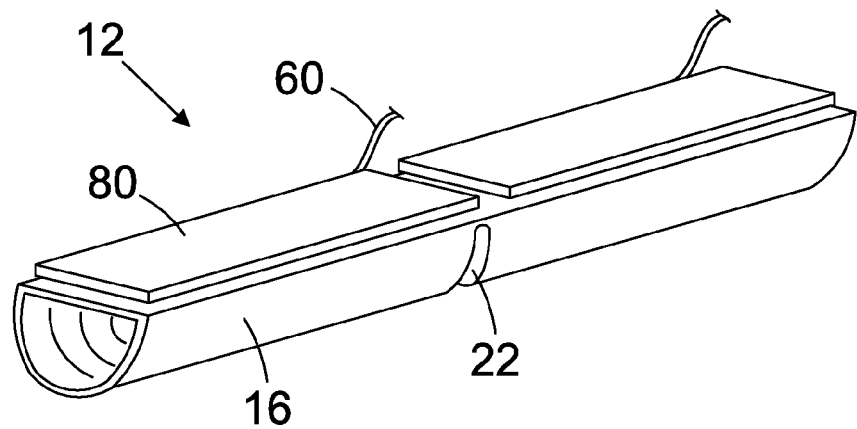
Figure 87:
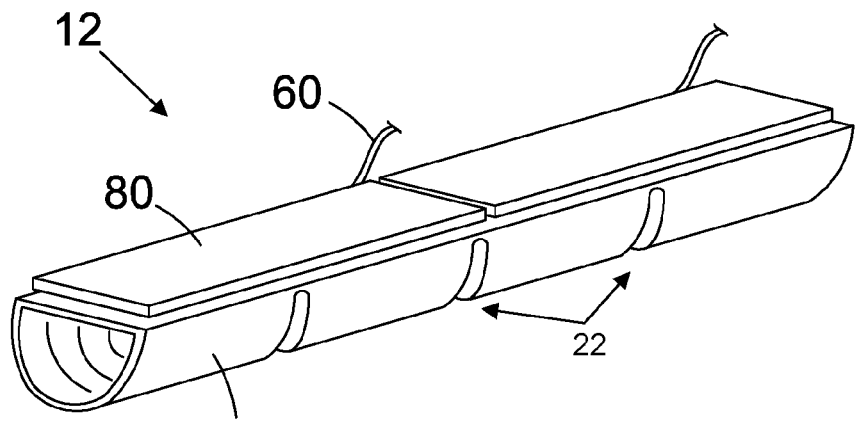
Figure 88:
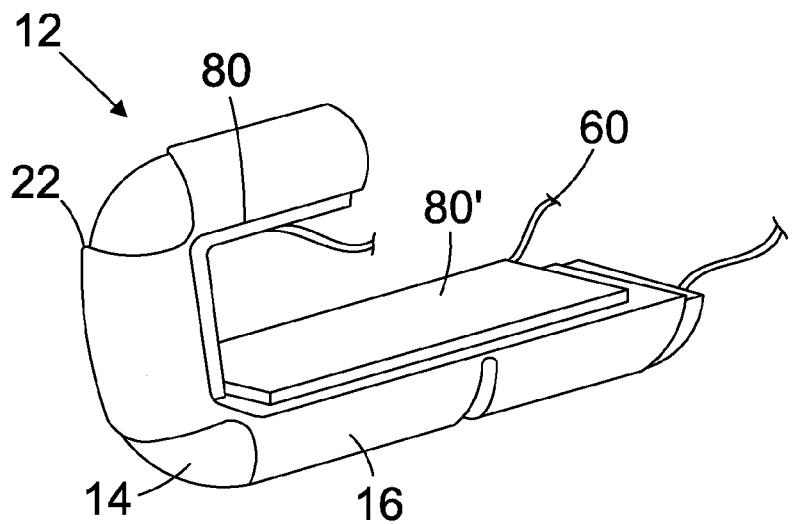

FIGS. 86-88 illustrate embodiments of an actuator 12 with segments that can stiffen, which can therefore control deformation, via activation of vacuum jamming pouches 80 mounted on the sleeve 16.

Figure 89:
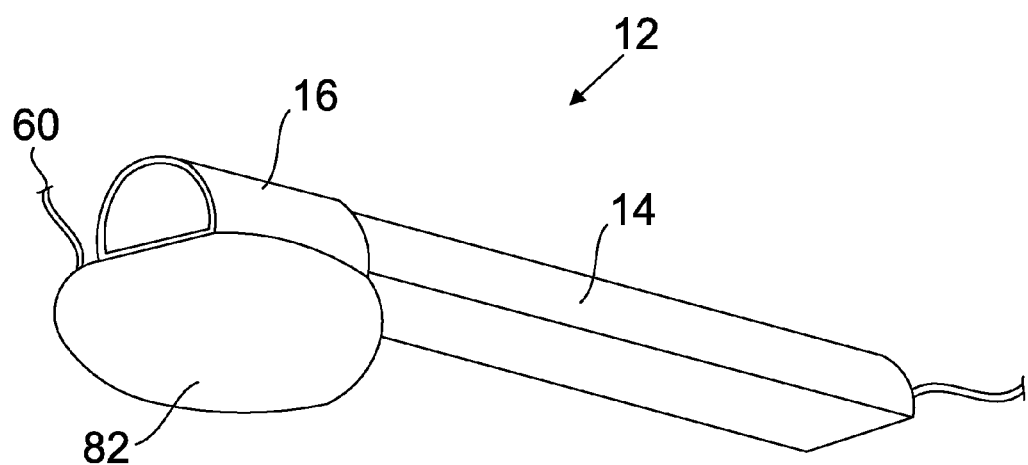

FIG. 89 illustrates an actuator 12 that includes a vacuum jamming gripper 82 mounted on the sleeve 16.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Figure 18:
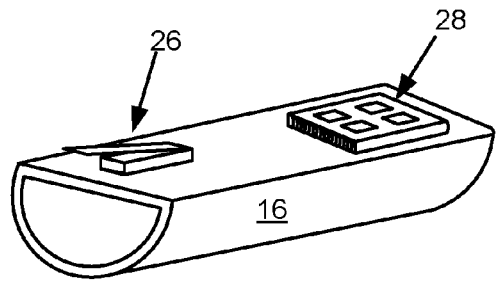
FIG. 18 shows a sleeve 16 that can act as a mounting substrate for electronics (e.g., a contact sensor 26 and a circuit board 28).
Figure 19:
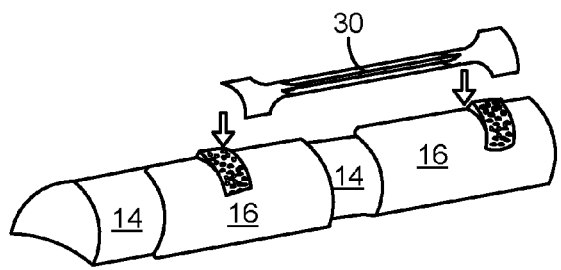
FIGS. 19 and 20 show a sleeve 16 that can act as an anchor point for a soft sensor, such as a strain gauge 30 (e.g., connecting via hooks and loops, sewn, glued, etc.).
Figure 20:
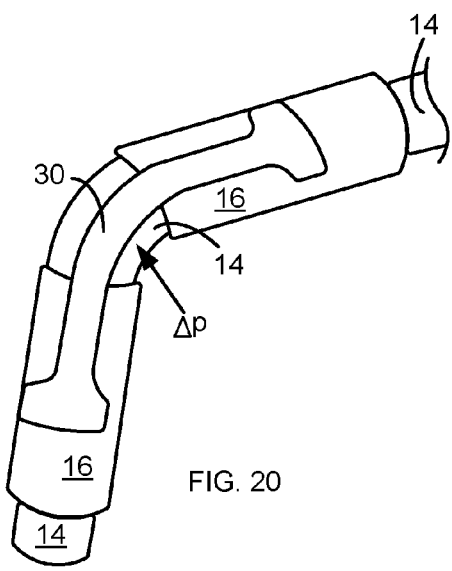
Figure 21:
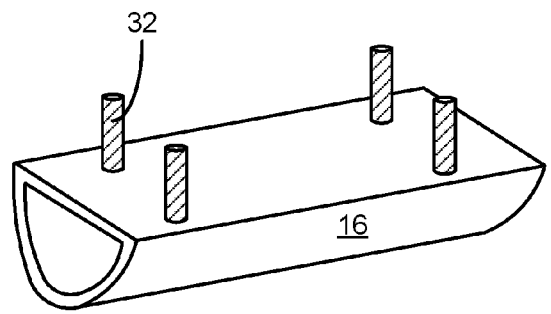
FIGS. 21-24 show a sleeve 16 that can act as an interface to connect rigid devices to a soft connector (e.g., a scoop, lever, spring or any mechanism to be actuated); in this embodiment, the sleeve 16 includes threaded posts 32 to serve as the interface.
Figure 22:
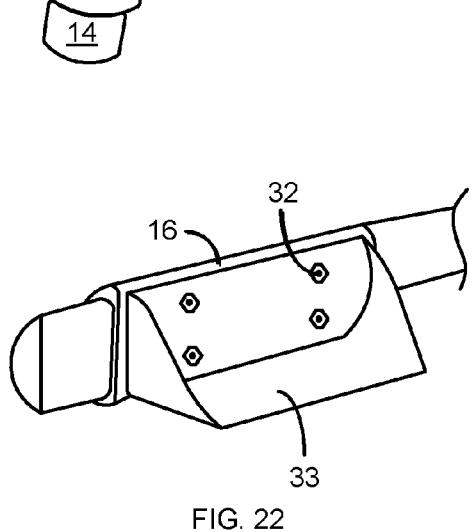
Figure 23:
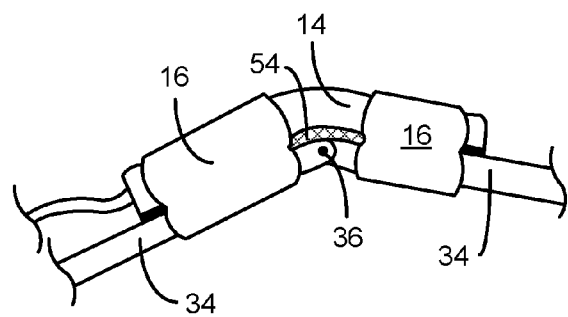
Figure 24:
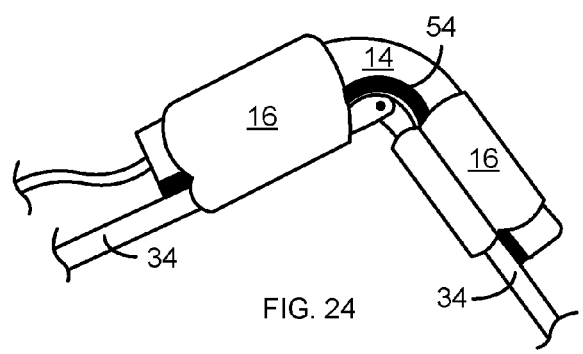

The methods and actuator designs disclosed, herein, can put the power of soft actuator customization into the user's hands and can eliminate the need to mold a new soft actuator to fit a particular application. As described herein, sleeves 16 can be used to mechanically program soft actuators 12, which allows rapid modification (e.g., on the order of minutes) of a soft actuator's motion and capabilities. As an example, FIGS. 1 and 2 show the motion of a curling soft actuator 12 when actuated by an activation mechanism 18 (e.g., as a pump fills the soft actuator body 14 with fluid). One means for generating the curling motion is to adhere a strain-limiting layer 54 that resists elastic or plastic deformation along its length (relative to unrestrained portions of the soft actuator body 14), thereby causing curling of the actuator 12, as shown in FIG. 5, when under stress (e.g., an increase in internal pressure). This motion can be adjusted by applying sleeves 16, such as shrink tubing, to the soft actuator body 14 and leaving a full or partial opening where bending motion is desired, as shown in FIGS. 3 and 4. Wrapping the soft actuator body 14 with such a sleeve 16 can convert the soft curling actuator body 14 to a more-acutely bending actuator (or can convert a linear actuator into a bending actuator, as discussed below and as shown in FIGS. 72-80) and can produce a distinctly different motion (e.g., joint-like bending). The use of sleeves 16 also enables new opportunities to add a variety of features and capabilities to the soft actuator body 14, such as interfacing with sensors 26, electronics, mechanical tools, and other soft actuators and inclusion of printed circuit boards 28 mounted thereon (see, FIGS. 18-24, 35-39 and 49). As shown in FIGS. 21 and 22, the sleeve can also include mounts 32 (in the form of threaded posts in this embodiment) for mounting other objects 33 to the sleeve 16 or for mounting the sleeve 16 to other structures. As shown in FIGS. 23 and 24, the actuator 12 can be mounted to rigid links 34, which are joined at a pivot 36 to form an actuating pivoting structure.

Soft actuator bodies 14 of this disclosure include walls that define a chamber 20 that can be formed of, e.g., hyper-elastic silicone, thermo plastic elastomer, thermo plastic urethane, rubber, elastic polyurethane, or polyethylene. Accordingly, the soft actuator body 14 can be designed to expand its dimensions, e.g., to 200% of its original dimensions before failure, while the sleeve 16 in which the soft actuator body 14 is contained can be formed of a flexible, rigid, and/or elastomeric material (e.g., in the form of a non-expanding fabric with, for example, no more than 1/10th the elasticity of the soft actuator body 14), such that the sleeve 16 constrains the soft actuator body 14 and such that the soft actuator body 14 presses against the sleeve 16 when the soft actuator body 14 is expanded (e.g., by an increase in internal pressure).

Figures 45, 46, 47:
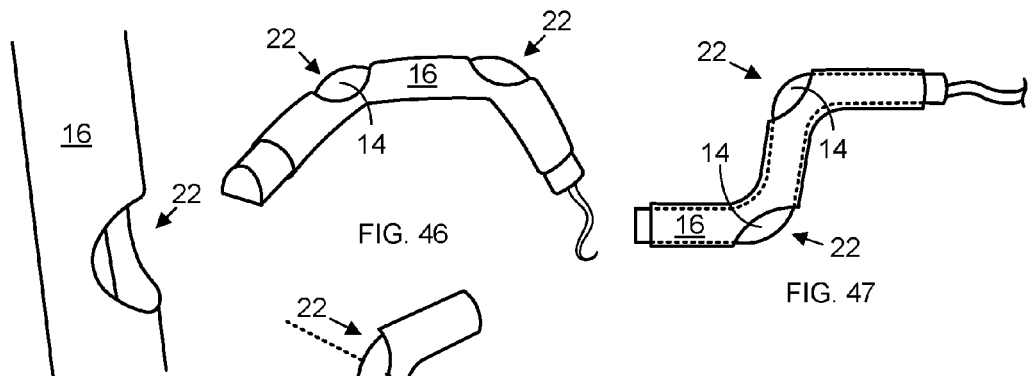
FIG. 45 shows a sleeve 16 with an aperture 22 to allow for bending of an underlying soft actuator body at the aperture 22.
FIGS. 46-48 show a sleeve 16 with a plurality of apertures 22 positioned at different length-wise and azimuthal locations on the sleeve 16 to provide for bending at different locations and about axes along differing orientations (wherein the direction of bending is shown with arrows 23 in FIG. 48.
Figure 48:
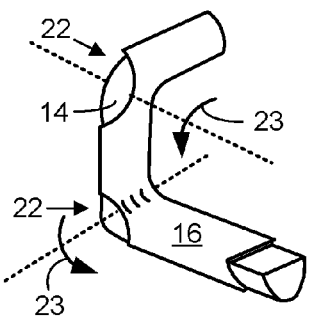

The combination of the soft actuator body 14 and constraining sleeve 16 can include any or all of the following features. First, the sleeves 16 can alter the motion of a soft actuator body 14. A single sleeve 16 can be used to move the bending position anywhere along the length of the soft actuator body 14 by limiting any part of the soft actuator body 14 that is enclosed in the sleeve 16 from deforming, as shown in FIG. 6, and by promoting deformation at an aperture 22 (in the form, e.g. of a slit or a cut-out, as shown in FIG. 45) in the sleeve 16. In additional embodiments, two sleeves 16 can be positioned and spaced apart to move the bending position and to alter the actuator's radius of curvature to create joint-like bending, as shown in FIGS. 3, 4, and 7. Additionally, the sleeves 16 can be thermoformed; or secured with a securing mechanism 24, such as pinch clamps 24', laces 24'' (e.g., with cable ties), rubber bands 24''', zip ties 24'''', inter-locking hook-and-loop structures 24''''' (e.g., VELCRO adhesive), or sewn thread; or rolled on thermally welded on or glued to the soft actuator body 14, as shown in FIGS. 8-14. In particular embodiments where the soft actuator 12 is used for medical applications, both the soft actuator body 14 and the sleeve 16 can be formed of or coated with a biocompatible material, such as silicone or parylene polymer. .In additional embodiments, sleeves 16 can be cut to different lengths to change the location and bending radius of "joints" created in the soft actuator 12. Additionally, the sleeves 16 can be designed to be removable from the soft actuator body 14 to free the soft actuator body 14 for re-use [e.g., the sleeves 16 can be cut off, slid off, untied, pulled apart (particularly when hook and loop structures are used), removed via the application of heat, etc.]

In still more embodiments, sleeves 16 can be used to create multiple joints with different radii of curvature around multiple axes on a single soft actuator body 14, as shown in FIGS. 15-17 and 46-48. The soft actuator body 14 does not necessarily have to contain a strain-limiting layer. Alternatively, the soft actuator body can be a linear extending soft actuator or any elastomeric bladder; and the uncut band of sleeve material behind the aperture 22 can perform the function of the strain-limiting layer 54, as shown in FIGS. 73-80.

Figure 25:
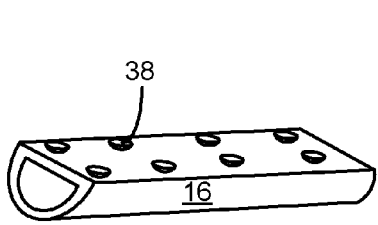
FIGS. 25-27 show the integration or embedding of magnets 38 (e.g., to facilitate alignment during grasping, for attaching tools, or for use in rapid collection of ferrous metal objects).
Figure 26:
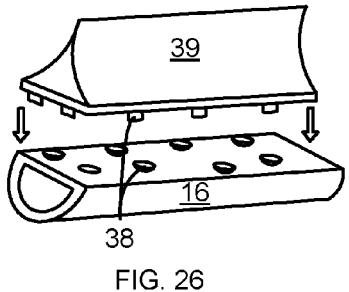
Figure 27:
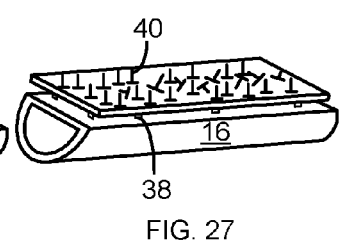
Figure 28:
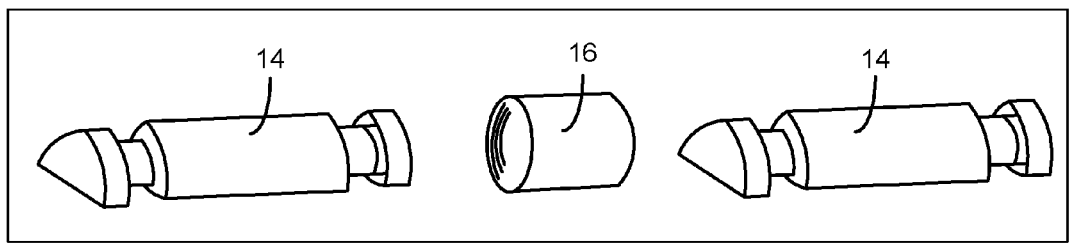
FIGS. 28 and 29 show the use of a sleeve 16 as a coupler to connect actuator bodies 14 in series.
Figure 29:
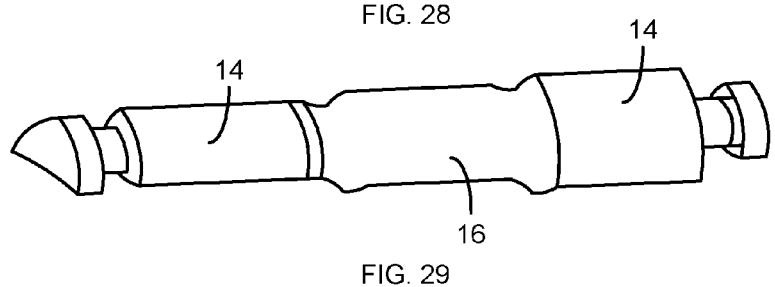
Figure 30:
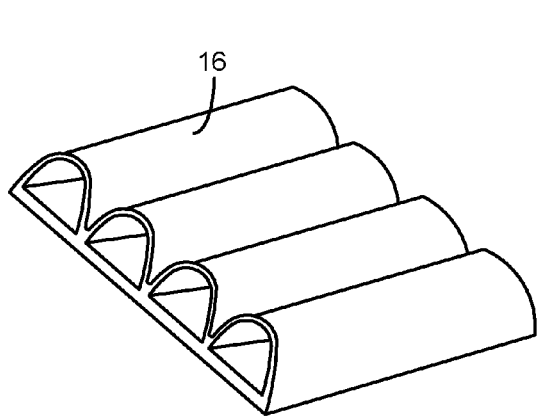
FIGS. 30 and 31 show the use of sleeves 16 connected in parallel to couple soft actuator bodies 14 together in parallel.
Figure 31:
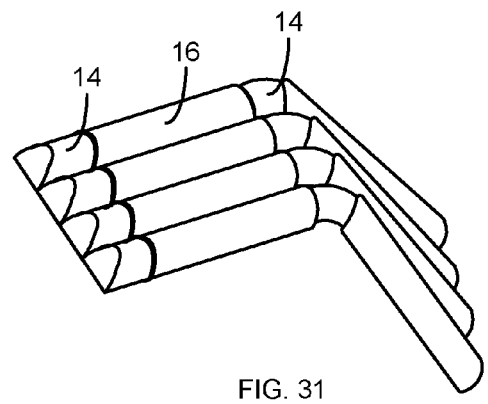
Figure 33:
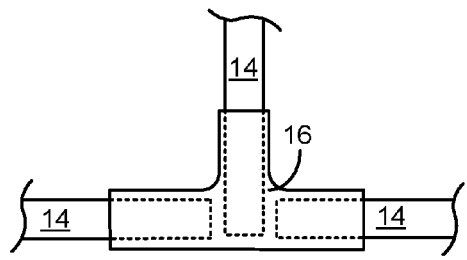
FIG. 33 shows the use of a sleeve 16 to join three soft actuator bodies 14 into an "T-joint".
Figure 34:
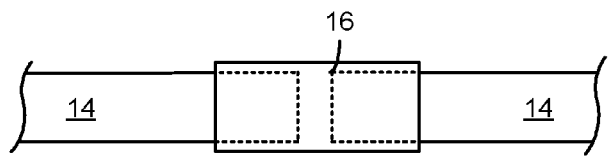
FIG. 34 shows the use of a sleeve 16 to join two soft actuator bodies 14 end-to-end.
Figure 35:
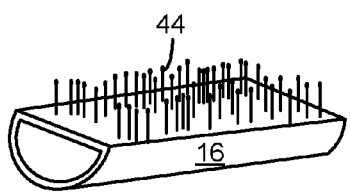
FIG. 35 shows brushes 44 extending from a surface of a sleeve 16.
Figure 36:
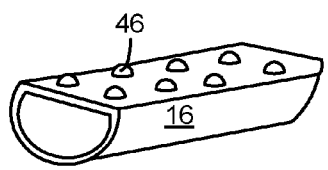
FIG. 36 shows bumps 46 protruding on a surface of a sleeve 16.
Figure 37:
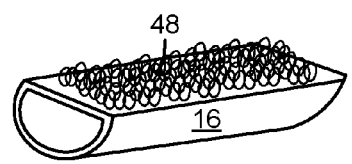
FIG. 37 shows loops 48 (alternatively, or in addition, hooks can be provided) on a surface of a sleeve 16.
Figure 38:
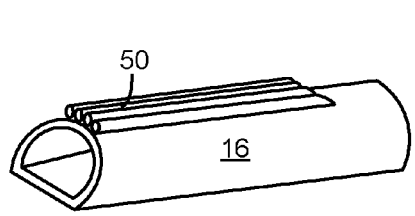
FIG. 38 shows a sleeve 16 with perimeter channels 50 for routing tubes and wires to minimize snagging and tangling.
Figure 39:
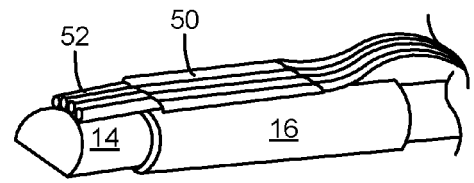
FIG. 39 shows the sleeve 16 of FIG. 38 with tubes and wires 52 fed through the perimeter channels 50 and with the sleeve 16 mounted on a soft actuator body 14.

The sleeves 16 can also act as a medium to interface with a whole suite of applications including the following: acting as an anchor point for electronics (e.g., an inertial measurement unit and mechanical contact switches); acting as an anchor point for soft sensors 26 and 30 (e.g., may be secured via interlocking hook and loop structures, sewn together, glued together, etc.); acting as an interface to connect rigid devices to a soft actuator body 14 (e.g., coupling to the actuator 12, via a mount 32, a scoop, lever, spring, or any mechanism that needs to be actuated); integrating or embedding magnets 38 (e.g., to facilitate alignment during grasping, attaching tools 39, or to use for rapid collection of ferrous metal objects 40), as shown in FIGS. 25-27; connecting multiple soft actuator bodies 14 in parallel, as shown in FIGS. 30 and 31, or in series (e.g., serving as X-, T-, and L-joints or end-to-end joints, as shown in FIGS. 28, 29, and 32-34), wherein the sleeves 16 can be used to create 3D structures; providing any of a variety of textures for gripping, twisting, sliding, or rolling objects (e.g., via brushes 44, a sticky surface, a bumpy surface 46, or via attachment mechanisms, such as hooks and/or loops 48, as shown in FIGS. 35-37); and routing tubing or wiring 52 through perimeter channels 50 to minimize snagging and tangling of the tubes and wires 52, as shown in FIGS. 38 and 39.

In FIGS. 83-85, a sleeve 16 that includes gripping features 49 for interfacing with objects is shown; the sleeve 16 can also extend further across the soft actuator body 14 and include apertures 22 or other features for bending or other forms of actuation, as shown in other embodiments.

In other embodiments, as shown in FIGS. 40 and 41, connected ring-shaped sleeve 16 sections that are narrow in width and spaced appropriately along a strain-limiting layer 54 can still achieve many of the interface applications, described above, without significantly changing the curling motion of the actuator 12.

Figure 32:
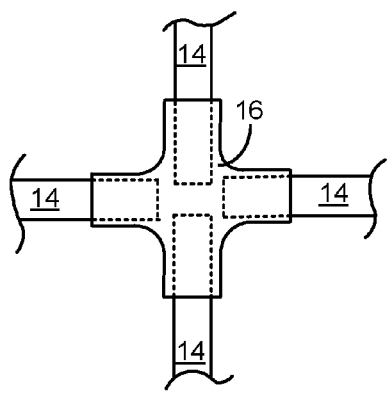
FIG. 32 shows the use of a sleeve 16 to join four soft actuator bodies 14 into an "X-joint".

The sleeves 16 can be formed of a single piece of material with cut-outs or slits 22 at different longitudinal and radial positions along and about the sleeve 16, as shown in FIGS. 46-48, 76 and 77, defining multiple bending positions along multiple axes and that can be used to join a plurality of soft actuator bodies 14, as shown in FIGS. 32-34 (e.g., with multiple interconnected sleeve ends).

Shown in FIGS. 42-44, at one end of the sleeve 16 is a fixture 58 attached to the soft actuator body 14 and including the pneumatic connection 60 which provides for fluid communication between a pump 18 and the chamber 20 defined by the walls of the soft actuator body 14. The range of motions of a 28A durometer sleeved soft bending actuator 12 at sleeve spacings of (a) 0 mm, (b) 15 mm, and (c) 30 mm are respectively shown for comparison in FIGS. 42-44. The shadow images 56 show the actuators 12 bending at different pressures.

Figure 49:
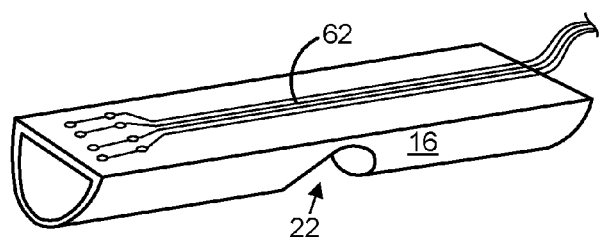
FIG. 49 shows a sleeve 16 with embedded electrical circuits and wiring 62.

The sleeves 16 can be anchored to the surface of the soft actuator body 14 through mechanical features on the surface of the soft actuator body 14 (e.g., bumps, bellows, Kevlar ribs, other geometric locking features, etc.); and the sleeves 16 can be formed with fiber reinforcement. The sleeves 16 can also have integrated electrical wiring 62 (as shown in FIG. 49), a circuit board 28, heating elements, cooling elements, temperature sensors, routing channels 50, capacitive sensors, force sensors 26, strain sensors 30 and so forth.

Figure 50:
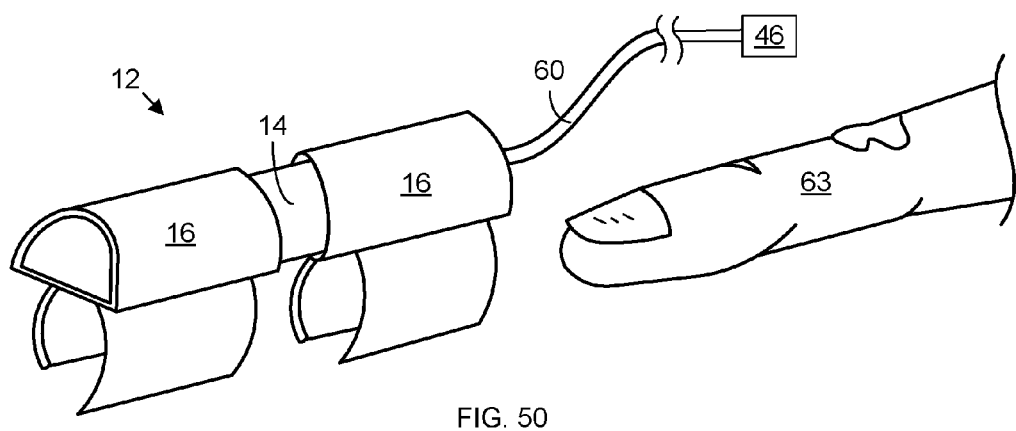
FIG. 50 shows a sleeve 16 that can connect a soft actuator 12 to a body part 63 (here, a finger).

In particular applications, the sleeves 16 can connect a soft actuator body 14 to a human (or other animal) body part 63, such as a finger, as shown in FIG. 50 (wherein the actuator 12 may be, e.g., 3-15 cm in length with a thickness of, e.g., 0.5 to 2 cm), or to any other jointed body part. In other embodiments, the sleeves 16 can connect soft actuator bodies 14 to clothing.

Figure 51:
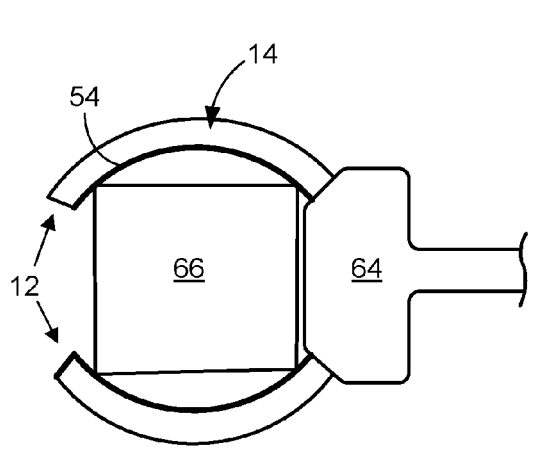
FIG. 51 shows an attempt to grasp a square object 66 with a manipulator including curling soft actuators 12 without sleeves.
Figure 52:
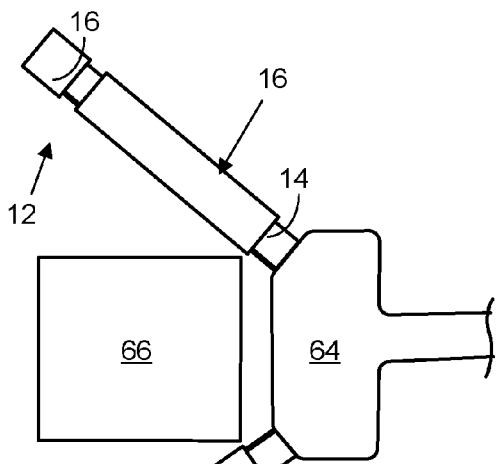
FIG. 52 shows a manipulator with curling soft actuators 12 covered with sleeves 16 having a length matching that of a side of an object 66 to be grasped.
Figure 53:
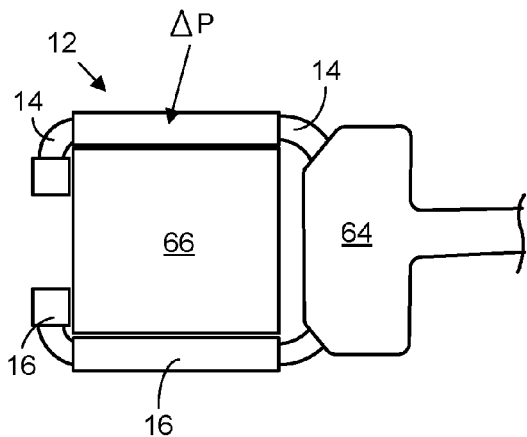
FIG. 53 shows the sleeved soft actuators 12 of the manipulator of FIG. 52 grasping an object 66.
Figure 54:
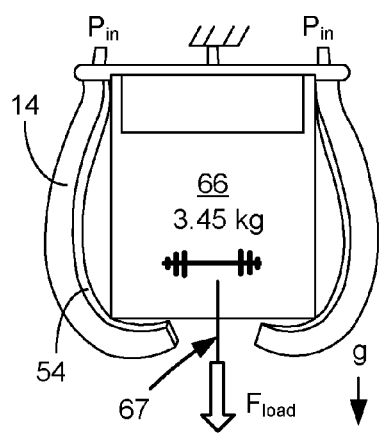
FIG. 54 shows soft actuator bodies 14 without sleeves supporting an object 66 under load.
Figure 55:
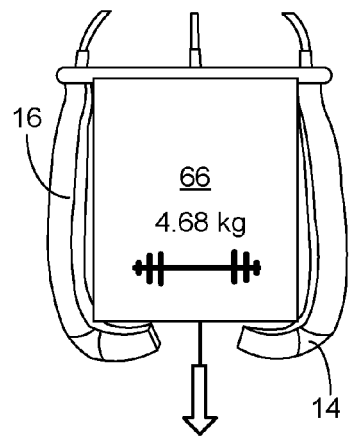
FIG. 55 shows soft actuators with sleeves 16 supporting an object 66 under a greater load.
Figure 56:
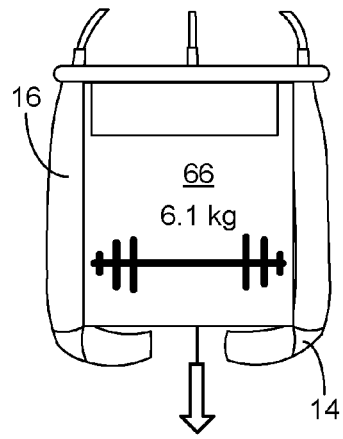
FIG. 56 shows soft actuators with sleeves 16 that have a fiber-reinforced laminate structure supporting an object 66 with a still greater load.

In additional embodiments, as shown in FIGS. 52, 53, 55, 55, and 58-60, soft actuators 12 can be assembled into a manipulator body 64, where sleeves 16 can be cut to different lengths to match (e.g., within 5%) the shape/dimensions of an object 66 to be grasped. For comparison, manipulators with sleeve-less curling soft actuator bodies 14 are shown in FIGS. 51, 54, and 57, where the curled soft actuators 12 can be seen to not conform closely to the surfaces of the object 66 to be manipulated. In the embodiments of FIGS. 54-56, an additional downward force is applied to the object 66 via a hook 67 extending from the object 66. Use of the proposed sleeve 16 enables improved shape matching to angular objects 66 and improved holding strength. In these embodiments, sleeve length can be tuned/adjusted (e.g., by rolling, sliding, screwing/unscrewing, etc.), as shown in FIGS. 61-69, to match the lengths of sides of the object 66 to be manipulated; and the sleeves 16 can be constructed from or combined with materials with rigid, flexible, and elastomeric properties. For example, a sleeve 16 can join two rigid components 54 to make a compliant joint, as shown in FIGS. 70 and 71.

FIG. 70 provides a cross-sectional comparison of a fiber-reinforced actuator 12 with and without a fiber-reinforced laminate, where (a) shows an illustrated cross section and actual side view of an unpressurized fiber-reinforced actuator 12; (b) shows expansion of the actuator walls due to fluid pressurization (note the outward bowing of the flat face 15); (c) demonstrates placement of the fiber-reinforced laminate on a fiber-reinforced actuator 12; and (d) shows an illustrated cross-sectional view of the actuator 12 when a sleeve 16 is added. The combination of the sleeve 16 and fiber-reinforced laminate stiffens the flat face 15 and eliminates or reduces visual indications of bowing.

FIG. 86 presents an alternative to the design of embodiment (c) in FIG. 70, where instead of integrating rigid elements 54 with the sleeve 16 to stiffen portions of the actuator, vacuum jamming pouches 80 are integrated into the sleeve 16. In this embodiment, the fluid line 60 connects to a vacuum source. Contained in the vacuum jamming pouches 80 are loose particles or laminate layers initially at atmospheric pressure. However, when these sections are exposed to a vacuum, the pouch walls close in on the contents, restricting their movement, and causing a phase transition (i.e., jamming) of pouches 80 to a more rigid state. Advantageous features of this configuration include the ability to adjust the stiffness of a pouch 80 by adjusting the vacuum pressure, and reversibility, where the initial flexible state of the pouch 80 can be returned by releasing the vacuum.

FIG. 87 presents a configuration of a sleeve 16, where vacuum jamming pouches 80 are placed opposite apertures 22 to actively control deformation of the actuator 12 at the apertures 22. FIG. 88 presents an illustration of this concept where the soft actuator body 14 is pressurized; however, a portion of the soft actuator body 14 at one aperture 22 (the furthest right) is restricted because the vacuum jamming pouch 80' is under a vacuum making it stiffer than the other pouch 80, which is at atmospheric pressure.

Vacuum jamming has also proven to provide effective means for gripping an object, as has been demonstrated by Cornell University and Empire Robotics, Inc. (see, e.g. US published patent application No. 20130106127 A1). To pick up an object, a vacuum jamming gripper 82, as shown in FIG. 89, with an internal pressure at atmosphere, is placed on top of the object and conforms to it. Vacuum is applied to harden the gripper 82, which generates gripping forces through friction from pinching, entrapment, and vacuum suction. Furthermore, the object can be released by injecting air into the gripper 82 to release the vacuum. FIG. 89 presents a concept where a vacuum jamming gripper 82 can be integrated with a sleeve 16 such that, depending on the task at hand, this gripping capability can be arbitrarily added to or removed from an actuator 12.

FIG. 71 illustrates the range of motion of a 28A durometer soft bending actuator 12 with 0.8-mm-thick fiber-reinforced laminates on the flat surface 15 of the soft actuator body 14 and with (a) 0 mm, (b) 15 mm, and (c) 30 mm spacing across the apertures 22 in the sleeves 16. A soft actuator 12 with an extension segment 70 that permits localized extension is shown in FIGS. 72 and 73. In this embodiment, the extension is facilitated by a gap between sections of a substantially inelastic outer sleeve 16" and an expandable inner sleeve 16' over a soft actuator body 14. Where the outer sleeve 16" is removed (producing a gap), the exposed inner sleeve 16' can radially expand and contract with fluid flow into and out of the soft actuator 12. At the bending joints, apertures 22 can be made in both sleeves 16' and 16" without completely severing the sleeves 16' and 16" to facilitate bending of the soft actuator 12 at these locations. Furthermore, for actuators 12 that produce more than one type of motion (such as bending, extending, contracting, extending-twisting, and bending-twisting to name a few), the sleeve 16 can be used as a means to lock or unlock these motions.

As shown in FIGS. 74-76, the sleeve 16 includes an uncut portion 69 behind the aperture 22 to provide a continuous length of sleeve material at each of the bending/pivot locations. A linearly extending soft actuator body 14 contained in a sleeve 16 with a plurality of apertures (slits) 22 configured to generate bending of the actuator about a plurality of axes with different orientations is shown in FIG. 77; and a linearly extending soft actuator body 14 converted into a bending actuator by a sleeve 16 with a plurality of apertures 22 that share a common orientation and consistent spacing there between is shown in FIG. 78.

A power grip glove 72 including a curling soft actuator 12 for each finger is shown in FIGS. 79 and 80, wherein each actuator 12 includes a linearly extending soft actuator body 14 contained in a sleeve 16 having a plurality of apertures 22 to convert the linear actuation of the soft actuator body 14 to a bending/curling motion. The position of the apertures 22 can be customized to align with the location of the wearer's joints. The elasticity of the soft actuator body 14 allows the actuator 12 to extend at joints to, e.g., maintain contact (without slipping) with a bending finger with which the actuator 12 is in contact. In other embodiments, the actuators 12 can be incorporated into another type of wearable apparel, wherein the actuators 12 can be configured along other joints and designed to generate greater or lesser force, as needed. Control electronics can also be incorporated into the apparel for controlling the pump 18 and thereby controlling actuation of the actuators 12.

In some applications, the actuator 12 can be disposable (e.g., discarded after a specified period of use, such as after one month of use) and replaced, while retaining the pump 18 for long-term reuse.

In other embodiments, the soft actuators 12 can be used independently (e.g., to create robotic hand) without joining the soft actuators 12 to a body part of a human or other organism. For example, a plurality of actuators 12 can extend from a hub to form a grasper that can pick up and manipulate objects in an environment that may be inhospitable to humans (e.g., at great depths, such as 200 meters deep or more, undersea).

In particular embodiments, the soft actuator body 14 can be provided on a reel, as shown in FIG. 81, and cut to a desired length. Using this embodiment, soft actuators 12 can be rapidly assembled by cutting the desired length of soft actuator body 14 from a reel and then capping the ends of the resulting soft actuator bodies 14, as shown in FIG. 82. At least one of the end caps 68 illustrated in FIG. 82 includes an embedded pneumatic or hydraulic connection passing there through (and to which a pneumatic or hydraulic pump 18 coupled with a fluid source is connected) to allow fluid to be pumped into the soft actuator body 14 to power its actuation; and a sleeve 16 can be fitted over the soft actuator body 14 with apertures 22 to allow for bending or curving of the actuator, 12 as desired.

In additional embodiments, the sleeve 16 can be formed of a material that is anisotropic to provide the actuator 12 with different properties (e.g., different strain characteristics) along different axes. Additionally, the sleeve 16 can be formed of a woven material that can then be made rigid by coating it with an epoxy or polyurethane. Further still, sleeves 16 can be applied to monolithic soft actuator bodies 14 that contain a plurality of air chambers. In still more embodiments, the sleeve 16 can include an electronic sensor [e.g., electromyography (EMG)] configured to detect signals (e.g., electrical signals, muscle activity) that accompany a human's effort to activate muscles to generate movement, which can then be mechanically assisted by the soft actuator 12 of this disclosure.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A mechanically programmed actuator comprising:
   at least one soft actuator body configured to bend, linearly extend, contract, twist, or combinations thereof when actuated without constraint;
   an activation mechanism configured to actuate the soft actuator; and
   at least one sleeve wrapped around at least a part of the soft actuator body and configured to constrain the soft actuator body inside the sleeve when actuated and to enable the soft actuator body to deform where the soft actuator body is not covered by the sleeve.

2. The mechanically programmed actuator of claim 1, wherein the soft actuator body defines an internal chamber, and wherein the activation mechanism includes a pump configured to pump fluid into the internal chamber to deform the soft actuator body.

3. The mechanically programmed actuator of claim 2, wherein the soft actuator body comprises at least one material that is at least one of flexible and elastomeric and that is selected from hyper-elastic silicone, thermoplastic urethane, thermoplastic elastomer, rubber, nylon, woven materials, non-woven materials, elastic polyurethane, and polyethylene.

4. The mechanically programmed actuator of claim 1, wherein the soft actuator body includes a strain-limiting layer along a side of the soft actuator body, and wherein the soft actuator body is configured to produce bending of the soft actuator body by restricting expansion of that side of the soft actuator body.

5. The mechanically programmed actuator of claim 1, where a plurality of sleeves are wrapped around respective parts of the soft actuator body, and wherein at least one of the sleeves (a) has a composition distinct from that of another of the sleeves and (b) has anisotropic mechanical properties distinct from that of another of the sleeves.

6. The mechanically programmed actuator of claim 5, wherein a gap is provided between at least two of the sleeves, causing the soft body actuator to deform at the gap between the sleeves.

7. The mechanically programmed actuator of claim 1, wherein the sleeve defines an aperture, causing the soft actuator body to deform at the aperture.

8. The mechanically programmed actuator of claim 1, wherein the sleeve includes a plurality of apertures, causing the soft actuator body to deform at the apertures.

9. The mechanically programmed actuator of claim 8, wherein the apertures are defined at different longitudinal and radial positions in the sleeve.

10. The mechanically programmed actuator of claim 1, wherein the sleeve includes an interface selected from electronics, sensors, magnets, routing, and coupling mechanisms.

11. The mechanically programmed actuator of claim 1, wherein the sleeve serves as a coupler between a plurality of the soft actuator bodies.

12. The mechanically programmed actuator of claim 1, wherein a plurality of sleeves are coupled together and contain parts of respective soft actuator bodies.

13. The mechanically programmed actuator of claim 1, wherein the sleeve is configured to have an adjustable length to alter the amount of the soft actuator body contained by the sleeve.

14. The mechanically programmed actuator of claim 1, wherein at least a portion of the sleeve is made rigid with a hardening material or agent.

15. The mechanically programmed actuator of claim 1, wherein the sleeve secures rigid parts to the actuator body.

16. The mechanically programmed actuator of claim 1, wherein the sleeve is removable.

17. The mechanically programmed actuator of claim 1, wherein at least one element having a stiffness greater than the soft actuator body is placed on or inside the sleeve so as to further control deformation of the soft actuator body.

18. The mechanically programmed actuator of claim 1, wherein the actuator includes inner and outer sleeves concentrically wrapped around the soft actuator body, wherein gaps or apertures are provided at the outer sleeves, exposing a portion of the inner sleeve.

19. A method for mechanical actuation, comprising:
   using a mechanically programmed actuator including at least one soft actuator body that defines a chamber and at least one sleeve wrapped around part of the soft actuator body; and pumping fluid into the chamber defined by the soft actuator body, causing the soft actuator body to deform where the soft actuator body is not covered by the sleeve, while the sleeve limits the soft actuator body from deforming where the sleeve covers the soft actuator body.

20. The method of claim 19, wherein the actuator includes at least two soft actuator bodies, each with at least one sleeve wrapped around part of each soft actuator body.

21. The method of claim 20, further comprising actuating the soft actuator bodies to grasp an object between the soft actuator bodies.

* * * * *